United States Patent Office 3,228,733
Patented Jan. 11, 1966

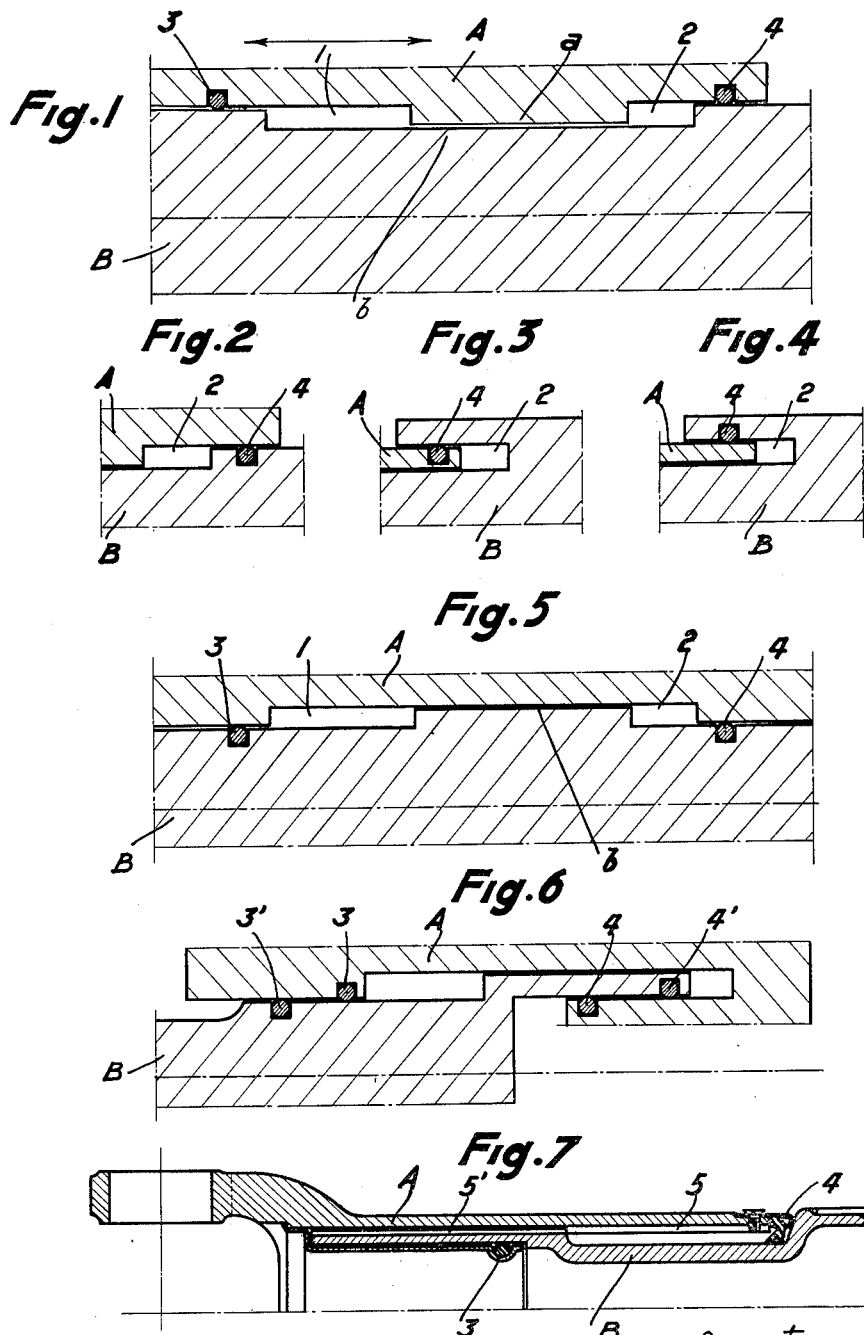

3,228,733
LUBRICATING MEANS FOR GUIDE MEANS OF SLIDING PARTS
Jacques Mangiavacchi, Chatou, France, assignor to Glaenzer Spicer Societe Anonyme, Poissy (Seine-et-Oise), France, a corporation of France
Filed June 29, 1962, Ser. No. 206,447
Claims priority, application France, July 13, 1961, 867,957
6 Claims. (Cl. 308—5)

This invention relates to lubricating means for guide means of sliding parts or elements.

It is known that it is difficult to obtain arrangements, having two parts relatively movable and, particularly, sliding one on the other, in which the chambers that provide the lubrication retain a constant total volume while the two parts are relatively displaced.

It is an object of the invention to obtain an arrangement whereby the total volume of these lubricating chambers remains constant.

It is a further object of the invention to obtain an arrangement in which the mutually sliding parts may have a relative supplementary rotary movement, with respect to one another.

It is also an object of the invention to obtain an arrangement in which the guide cross section of the parts can be circular or non-circular, constant or variable along the parts.

The arrangement of the invention consists in one or more guide recesses provided in one of the sliding parts and in one or more steps provided in the other part to cooperate with the one or more said recesses, so as to insure in the customary manner, lubrication of the parts during their relative displacement; and a plurality of sealing means provided at the two ends of the chambers formed on both sides of said steps by said one or more recesses, so as to form a sealed lubricating surround, the total volume of which remains constant during the relative movement of the two parts.

The sealing means can be housed in grooves provided in one or the other or in both of the sliding parts. They can also be housed in elements integral with, or connected to, one or both parts.

The sealing means can be carried by the inner part or by the outer part, or by both.

The means of the invention will now be described in detail, with reference to the accompanying drawings, in which:

FIGURE 1 diagrammatically shows the construction of the invention;

FIGURES 2 to 4 show various positions of the sealing means;

FIGURES 5 and 6 show two other embodiments of the invention; and

FIGURE 7 shows a practical application of the invention.

FIGURE 1 diagrammatically shows part A and part B, slidable on each other. To this end, guide surface or working face $b$ of part B is in local or complete contact with guide surface $a$ of part A. This latter surface, however, is much shorter than guide surface $b$ of part B, permitting a longitudinal displacement and, should the need arise, a rotation of part A with respect to part B, on which it is mounted. When relative displacement between parts A and B takes place, lubricant flows from one chamber to the other between the working face $b$ and the guide surface $a$. In conformity with the invention, and for the purpose of maintaining constant the sum of the volumes of chambers or portions 1 and 2, sealing means or elements 3 and 4 are provided at the two ends of the chambers, such that the annular cross sections of the chambers 1 and 2 are equivalent on both sides.

For cylindrically cooperating parts, it suffices that sealing means 3 and 4 of one part bear on the same diameter of the other part, such that the amount of volume gained, for example, on the right is equal to that lost on the left, and vice versa when there is relative movement.

FIGURES 2 to 4 show various ways in which a toric seal 4 can be provided between parts A and B. Whether it is part A or part B, the portions receiving seals 3 and 4 and the portions serving as friction surfaces for the seals 3 and 4 will always be integral with or built upon these parts.

The embodiments considered above can be submitted to centrifugal force caused, for example, by rotation of the parts. It can be anticipated to locate the working or guiding diameters on the outer section of the parts. In this case, the sealing diameters would be placed inside, as shown in FIGURE 5. Thus, the working faces $a$ and $b$ will be submitted to a maximum centrifugal force, and benefit from an improved lubrication, at the same time that seals 3 and 4 wil be submitted to the minimum centrifugal force, so that almost no lubricant is lost.

Moreover, the sealing means can be so located that they act subsidiarily by centrifugal action, the centrifugal action tending to press the seals 3 and 4 outwardly into a tight sealing relationship, as would be the case in adopting the positions shown in FIGURES 2, 3, and 5.

It is apparent that it is possible, on one or both sides of chambers 1 and 2, to double or further multiple the number of sealing means. As a simple example, FIGURE 6 shows one such arrangement in which parts A and B are provided with seals 3, 3' and 4, 4', which can be positioned on one part only or on both.

The means of the invention has numerous applications in the mechanical field.

By way of example, and not in limitation thereof, FIGURE 7 shows the invention applied to a universal transmission joint, in which parts A and B have only a relative sliding movement. It will be noticed from the figure that seals 3 and 4 are unitary and of a form appropriate to their position. In particular, seal 3 is housed in an extension of part A. Parts A and B include grooves 5 and 5' acting as reciprocal guides for the parts and as their mutual rotation drive means.

It is apparent that mnay modifications of the above examples, offered in illustration, and not in limitation thereof, are possible, without departing from the scope or spirit of the invention.

What I claim is:

1. Apparatus for lubricating relatively slidable parts, said apparatus comprising a first sliding part; a second sliding part adjacent to said first part; means for defining two interconnected, annular lubrication chambers between said parts which have a total volume that remains constant during relative sliding by said parts, said means comprising a recess in said first part and having a first guide surface, and a step on said second part extending into said recess and having a second guide surface in guide movement relation to said first guide surface, the recess being larger than the step and said step being impervious to flow of lubricant therethrough between said chambers, whereby lubricant can pass from one chamber to the other and vice versa only between said first and second guide surfaces, and sealing means disposed between said sliding parts for sealing off the opposite ends of the two lubrication chambers.

2. Apparatus as claimed in claim 1, wherein both of said annular chambers have the same inner diameter and the same outer diameter.

3. Apparatus as claimed in claim 1, wherein both of said annular chambers have the same outer diameter.

4. Apparatus as claimed in claim 3, wherein said sealing means are provided in both of said sliding parts.

5. An apparatus for lubricating relatively slidable parts, said apparatus comprising an outer sliding part; an inner sliding part adjacent to and within said outer part; means for forming two interconnected, annular lubrication chambers between said parts which have the same outer diameter and a total volume that remains constant during relative sliding by said parts, said means comprising a recess in said outer part and having a first guide surface, and a step on said inner part extending into said recess and having a second guide surface in guide movement relation to said first guide surface, the recess being larger than the step and said step being impervious to flow of lubricant therethrough between said chambers, whereby lubricant can pass from one chamber to the other and vice versa only between said first and second guide surfaces; and sealing means disposed in said inner part for sealing off the opposite ends of the two lubrication chambers.

6. An apparatus for lubricating relatively slidable parts, said apparatus comprising an outer sliding part; an inner sliding part adjacent to and within said outer part; means for forming two interconnected, annular lubrication chambers between said parts which have the same inner diameter, the same outer diameter, and a total volume that remains constant during relative sliding by said parts, said means comprising a recess in one of said sliding parts and having a first guide surface, and a step on the other part extending into said recess and having a second guide surface in guide movement relation to said first guide surface, the recess being larger than the step and said step being impervious to flow of lubricant therethrough between said chambers, whereby lubricant can pass from one chamber to the other and vice versa only between said first and second guide surfaces; sealing means disposed between said sliding parts for sealing off the opposite ends of the two lubrication chambers; and groove means located in said inner part for receiving said sealing means to cause said sealing means to be pressed outwardly against said outer part into tight sealing relationship therewith by the centrifugal force produced when said sliding parts are subjected to rotation.

References Cited by the Examiner
UNITED STATES PATENTS

| | | | |
|---|---|---|---|
| 2,462,659 | 2/1949 | Molotzak | 308—5 |
| 2,570,427 | 10/1951 | Chillson | 277—25 |
| 2,631,068 | 3/1953 | Saul | 184—5 |
| 2,964,015 | 12/1960 | Garey | 64—23 |
| 3,042,417 | 7/1962 | Dermon | 277—25 |

FOREIGN PATENTS

| | | |
|---|---|---|
| 1,063,197 | 6/1952 | France. |

OTHER REFERENCES
Serial No. 296,851, Tonnies, (A.P.C.), published May 25, 1943.

DAVID J. WILLIAMOWSKY, *Primary Examiner.*

ROBERT C. RIORDON, FRANK SUSKO, DON A. WAITE, *Examiners.*

H. S. KIESER, L. L. JOHNSON, *Assistant Examiners.*